US012465232B2

(12) United States Patent
Lyon

(10) Patent No.: US 12,465,232 B2
(45) Date of Patent: Nov. 11, 2025

(54) METHOD AND SYSTEM FOR MONITORING BRAIN FUNCTION AND INTRACRANIAL PRESSURE

(71) Applicant: Augusta University Research Institute, Inc., Augusta, GA (US)

(72) Inventor: Matthew Lyon, North Augusta, SC (US)

(73) Assignee: Augusta University Research Institute, Inc., Augusta, GA (US)

( * ) Notice: Subject to any disclaimer, the term of this patent is extended or adjusted under 35 U.S.C. 154(b) by 0 days.

(21) Appl. No.: 18/165,096

(22) Filed: Feb. 6, 2023

(65) Prior Publication Data

US 2023/0181053 A1 Jun. 15, 2023

Related U.S. Application Data

(63) Continuation of application No. 16/562,776, filed on Sep. 6, 2019, now abandoned.
(Continued)

(51) Int. Cl.
 *A61B 5/00* (2006.01)
 *A61B 5/03* (2006.01)
 *A61B 5/369* (2021.01)

(52) U.S. Cl.
 CPC ............ *A61B 5/031* (2013.01); *A61B 5/0024* (2013.01); *A61B 5/369* (2021.01); *A61B 5/6803* (2013.01); *A61B 5/6814* (2013.01); *A61B 5/743* (2013.01)

(58) Field of Classification Search
 CPC ....... A61B 5/031; A61B 5/0024; A61B 5/369; A61B 5/6803; A61B 5/6814; A61B 5/743;
(Continued)

(56) References Cited

U.S. PATENT DOCUMENTS 5,190,929 A 3/1993 Borch et al.
6,387,051 B1 5/2002 Ragauskas et al.
(Continued)

FOREIGN PATENT DOCUMENTS

WO 2004/084933 A1 10/2004
WO 2008/147482 A2 12/2008
WO 2012/037204 A1 3/2012

OTHER PUBLICATIONS

Hayreh, et al., "The role of optic nerve sheath fenestration in management of anterior ischemic optic neuropathy," Arch Opthalmol., 108(8):1063-1065 (1990).
(Continued)

*Primary Examiner* — May A Abouelela
(74) *Attorney, Agent, or Firm* — Smith, Gambrell & Russell, LLP

(57) ABSTRACT

Embodiments of the present systems and methods may provide improved, automated monitoring of brain function. In embodiments, a multimodal, multi-sensor monitoring device may provide to monitoring of the full spectrum of brain function. In an embodiment, a system for monitoring brain function of a subject may include an apparatus for mounting a plurality of stimulus and response sensors on a head of the subject, including a cognizance stimuli-sensor suite, a physiologic sensor suite, and advance monitoring devices such as a transcranial Doppler puck, an electroencephalograph monitor, and an optic nerve sheath parameter sensor.

18 Claims, 9 Drawing Sheets

Related U.S. Application Data

(60) Provisional application No. 62/728,175, filed on Sep. 7, 2018.

(58) Field of Classification Search
CPC ..... A61B 5/0205; A61B 5/1075; A61B 5/377; A61B 8/06; A61B 8/10; A61B 8/4209; A61B 8/483; A61B 8/488; A61B 8/5223
See application file for complete search history.

(56) References Cited

U.S. PATENT DOCUMENTS

| | | | |
|---|---|---|---|
| 6,395,876 B1 | 5/2002 | Munn et al. | |
| 6,451,840 B1 | 9/2002 | Munn et al. | |
| 6,949,535 B2 | 9/2005 | Sadhu et al. | |
| 8,535,656 B2 | 9/2013 | Kabanov et al. | |
| 8,546,082 B2 | 10/2013 | Hall et al. | |
| RE44,599 E | 11/2013 | Fowler et al. | |
| 8,672,851 B1 | 3/2014 | Quirk et al. | |
| 9,101,279 B2* | 8/2015 | Ritchey | G06F 3/147 |
| 9,398,861 B2 | 7/2016 | Bellezza et al. | |
| 9,460,744 B1* | 10/2016 | Gaub | G11B 5/59694 |
| 9,606,120 B2 | 3/2017 | Bettsworth et al. | |
| 10,405,374 B2* | 9/2019 | Zhu | H01Q 9/0421 |
| 10,856,803 B1* | 12/2020 | Guez | A61B 5/4836 |
| 10,863,940 B2* | 12/2020 | Gazzaley | G09B 19/00 |
| 10,888,241 B2* | 1/2021 | Siwoff | A61B 5/7235 |
| 10,901,508 B2* | 1/2021 | Laszlo | G06N 20/00 |
| 11,311,188 B2* | 4/2022 | Hooriani | G16H 40/60 |
| 2007/0202077 A1 | 8/2007 | Brodsky et al. | |
| 2010/0135900 A1 | 6/2010 | Cerveny et al. | |
| 2011/0135655 A1 | 6/2011 | Katsikis et al. | |
| 2012/0010229 A1 | 1/2012 | MacDougall et al. | |
| 2013/0012802 A1* | 1/2013 | Horseman | A61B 5/0022 600/545 |
| 2013/0150684 A1 | 6/2013 | Cooner | |
| 2014/0163333 A1* | 6/2014 | Horseman | A61B 5/1113 600/301 |
| 2015/0051489 A1 | 2/2015 | Caluser et al. | |
| 2015/0148681 A1* | 5/2015 | Abreu | A61B 5/6821 600/474 |
| 2015/0199010 A1* | 7/2015 | Coleman | H04L 67/01 345/156 |
| 2016/0000354 A1* | 1/2016 | Hagedorn | A61N 1/0456 607/45 |
| 2016/0000367 A1* | 1/2016 | Lyon | A61B 8/5207 600/425 |
| 2016/0051669 A1 | 2/2016 | Khleif et al. | |
| 2016/0213301 A1* | 7/2016 | Port | A61B 5/743 |
| 2016/0246373 A1* | 8/2016 | Sakaguchi | G06F 3/016 |
| 2016/0262687 A1* | 9/2016 | Vaidyanathan | A61B 5/0205 |
| 2017/0252216 A1* | 9/2017 | Maeda | H04N 13/398 |
| 2017/0296421 A1* | 10/2017 | Travers | G02B 27/0172 |
| 2017/0347906 A1* | 12/2017 | Intrator | A61B 5/726 |
| 2018/0103894 A1* | 4/2018 | Tzvieli | A61B 5/015 |
| 2018/0103917 A1* | 4/2018 | Kim | A61B 5/291 |
| 2018/0132739 A1* | 5/2018 | Brekken | A61B 8/485 |
| 2018/0279934 A1* | 10/2018 | Wo | H04L 63/0428 |
| 2018/0280656 A1* | 10/2018 | Cole | A61B 5/486 |
| 2018/0296191 A1* | 10/2018 | Mellema | G01S 15/8915 |
| 2018/0310855 A1* | 11/2018 | Connor | A61B 5/6814 |
| 2018/0333092 A1* | 11/2018 | Roshan | A61B 3/0091 |
| 2019/0008441 A1* | 1/2019 | Guzik | A61B 5/6898 |
| 2019/0019336 A1* | 1/2019 | Coggins | G06T 19/006 |
| 2019/0038166 A1* | 2/2019 | Tavabi | G06F 3/015 |
| 2019/0059769 A1* | 2/2019 | Nenadovic | A61B 5/316 |
| 2019/0059821 A1* | 2/2019 | Pekonen | A61B 5/02438 |
| 2019/0134395 A1* | 5/2019 | Fitzgerald | A61N 1/36025 |
| 2019/0142270 A1* | 5/2019 | Monhart | G06F 3/017 351/209 |
| 2019/0307350 A1* | 10/2019 | Sridhar | A61B 5/4088 |
| 2019/0369726 A1* | 12/2019 | Kang | A61B 5/389 |
| 2020/0029819 A1* | 1/2020 | Yamada | A61B 5/6814 |
| 2020/0029851 A1* | 1/2020 | Siwoff | A61B 5/6814 |
| 2020/0060573 A1* | 2/2020 | Cohen | A61B 5/377 |
| 2020/0069209 A1* | 3/2020 | Keane | A61B 5/7225 |
| 2020/0139112 A1* | 5/2020 | Aharonovitch | A61B 5/11 |
| 2021/0093247 A1* | 4/2021 | Pyrzowski | A61B 5/7264 |
| 2021/0141453 A1* | 5/2021 | Miller, III | A61B 5/369 |
| 2021/0145450 A1* | 5/2021 | Gruentzig | A61B 5/6803 |

OTHER PUBLICATIONS

Killer et al., "Architecture of arachnoid trabeculae, pillars, and septa in the subarachnoid space of the human optic nerve: anatomy and clinical considerations," Br J Opthamol, 87(6):777-781 (2003).

Kimberly et al., "Correlation of Optic Nerve Sheath Diameter with Direct Measurement of Intracranial Pressure," Society for Academic Emergency Medicine, 15(2), 201-204 (2008).

Bach, "The effect of Infections on susceptibility to autoimmune and allergic diseases", N. Eng. J. Med., 347:911-20 (2002).

Barka, et al., "Transduction of TAT-HA-β-galactosidase fusion protein into salivary gland-derived cells and organ cultures of the developing gland, and into rat submandibular gland in vivo", Histochem. Cytochem., 48(11):1453-60 (2000).

Bernstein, et al., "Role for a bidentate ribonuclease in the initiation step of RNA interference", Nature, 409:363-6 (2001).

Bluestone, et al., "Natural versus adaptive regulatory T cells", Nat Rev Immunol, 3:253-7 (2003).

Boland, et al., "Mapping of deletion and translocation breakpoints in 1q44 implicates the serine/threonine kinase AKT3 in postnatal microcephaly and agenesis of the corpus callosum", Am J Hum Gene., 81 :292-303 (2007).

Carson, et al., "Impaired T cell receptor signaling in Foxp3+ CD4 T cells", Ann NY Acad Sci., 1103:167-78 (2007).

Crellin, et al., "Altered activation of AKT is required for the suppressive function of human CD4$^+$CD25$^+$ T regulatory cells", Blood, 109:2014-22 (2006).

Crellin, et al., "Flow cytometry-based methods for studying signaling in human CD4$^+$CD25$^+$ FOXP3$^+$ T regulatory cells", J Immunol Methods, 324:92-104 (2007).

Dannull, et al., "Enhancement of vaccine-mediated antitumor immunity in cancer patients after depletion of regulatory T cells", J Clin Invest., 115:3623-33 (2005).

DeBosch, et al., "Akt2 regulates cardiac metabolism and cardiomyocyte survival", J. Biol. Chem, 281:32841-51 (2006).

Derossi, et al., "The third helix of the Antennapedia homeodomain translocates through biological membranes", J. Biol. Chem., 269(14):10444-50 (1994).

Elbashir, et al., "Duplexes of 21-nucleotide RNAs mediate RNA interference in cultured mammalian cells", Nature, 411:494-8 (2001b).

Elbashir, et al., "RNA interference is mediated by 21- and 22-nucleotide RNAs", Genes Dev., 15:188-200 (2001).

Emamian, et al., "Convergent evidence for impaired AKT1-GSK3β signaling in schizophrenia", Nat Genet, 36:131-137 (2004).

Final Rejection mailed May 23, 2018 for U.S. Appl. No. 14/832,915 (8 pgs).

Final Rejection mailed Oct. 10, 2019 for U.S. Appl. No. 14/832,915 (7 pgs).

Fire, et al., "Potent and specific genetic interference by double-stranded RNA in *Caenorhabditis elegans*", Nature, 391:806-11 (1998).

Fontenot, et al., "Foxp3 programs the development and function of CD4$^+$ CD25$^+$ regulatory T cells", Nat Immunol, 4(4):330-6 (2003).

Fousteri, et al., "Subcutaneous insulin B:9-23/IFA immunisation induces Tregs that control late-stage prediabetes in NOD mice through IL-10 and IFNγ", Diabetologia, 53:1958-70 (2010).

Franke "Intracellular signaling by Akt: bound to be specific" , Science 1 (24):pe29: 1-4 (2008).

Frankel and Pabo, "Cellular uptake of the tat protein from human immunodeficiency virus", Cell, 55(6):1189-93 (1988).

Furman et al., 2010, Blood, vol. 116: Abstract 55 (3 pgs).

Garofalo, et al., "Severe diabetes, age-dependent loss of adipose tissue, and mild growth deficiency in mice lacking Akt2/PKBβ", J Clin Invest., 112:197-208 (2003).

(56) References Cited

OTHER PUBLICATIONS

Genbank, Accession No. Y10055.2, "*Homo sapiens* mRNA for phosphoinositide 3-kinase", 2 pages, first appeared May 18, 1997, accessed Nov. 13, 2015.
George, et al., "A family with severe insulin resistance and diabetes due to a mutation in AKT2", Science, 304:1325-8 (2004).
Glisic, et al., "Inducible regulatory T cells (iTregs) from recent-onset type 1 diabetes subjects show increased in vitro suppression and higher ITCH levels compared with controls", Cell and Tissue Research, 339:585-95 (2010).
Hammond, et al., "An RNA-directed nuclease mediates post-transcriptional gene silencing in *Drosophila cells*", Nature, 404:293-6 (2000).
Hannon, "RNA interference", Nature, 418:244-51 (2002).
Haribhai, et al., "A requisite role for Induced regulatory T cells in tolerance based on expanding antigen receptor diversity", Immunity, 35(1):109-122 (2011).
Haxhinasto, "The AKT-mTOR axis regulates de nova differentiation of CD4$^+$Foxp3$^+$ cells", J. Exp. Med., 205:565-74 (2008).
Hayashi, et al., "Inhibition of experimental asthma by indoleamine 2,3-dioxygenase", J. Clin. Investig., 114(2):270-279 (2004).
Ho, et al., "Synthetic protein transduction domains: enhanced transduction potential in vitro and in vivo", Cancer Res., 61(2):474-7 (2001).
Ho, et al., "Tolerizing DNA vaccines for autoimmune arthritis", Autoimmunity, 39(8):675-82 (2006).
Hori, et al., "Control of regulatory T cell development by the transcription factor Foxp3", Science, 299:1057-61 (2003).
Hyrup, et al., "Peptide nucleic acids (PNA): synthesis, properties and potential applications", Bioorgan. Med. Chem., 4:5-23 (1996).
Ilan, "Oral tolerance: can we make it work", Human Immunol., 70:768-76 (2009).
Johnson, et al., "Targeting the immunoregulatory indoleamine 2,3 dioxygenase pathway in immunotherapy", Immunotherapy, 1(4):645-661 (2009).
Kabouridis, "Biological applications of protein transduction technology", Trends in Biotechnology (11):498-503 (2003).
Khattri, et al., "An essential role for Scurfin in CD4$^+$CD25$^+$ T regulatory cells", Nat Immunol., 4(4):337-42 (2003).
Kim et al., "Natural and inducible $T_H17$ cells are regulated differently by Akt and mTOR pathways", Nat Immunol., 14(6):611-8 (2013).
Li, et al., "CD4$^{+CD25+}$ regulatory T-cell lines from human cord blood have functional and molecular properties of T-cell energy", Blood, 106:3068-73 (2005).
Liang, et al., "Design of new oxazaphosphorine anticancer drugs", Curr Pharm Des., 13(9):963-78 (2007).
Martinez, et al., "Single-stranded antisense siRNAs guide target RNA cleavage in RNAi", Cell, 110:563-74 (2002).
Nakatani, et al., "Up-regulation of Akt3 in estrogen receptor-deficient breast cancers and androgen-independent prostate cancer lines", J Biol Chem., 274:21528-32 (1999).
Napoli, et al., "Introduction of a Chimeric Chalcone Synthase Gene into Petunia Results in Reversible Co-Suppression of Homologous Genes in trans", Plant Cell, 2:279-89 (1990).
Non-Final Rejection mailed Jun. 9, 2020 for U.S. Appl. No. 14/832,915 (7 pgs).
Non-Final Rejection mailed Mar. 29, 2019 for U.S. Appl. No. 14/832,915 (6 pgs).
Non-Final Rejection mailed Nov. 9, 2017 for U.S. Appl. No. 14/832,915 (8 pgs).
Nykänen, et al., "ATP requirements and small interfering RNA structure in the RNA interference pathway", Cell, 107:309-21 (2001).
Parry, et al., "Signalling to suit function: tailoring phosphoinositide 3-kinase during T-cell activation", Trends Immunol., 28:161-168 (2007).
Patton, et al., "Cutting edge: the phosphoinositide 3-kinase p110δ is critical for the function of CD4+CD25 Foxp3+ regulatory T cells". J. Immunol., 177:6598-602 (2006).
Patton, et al., "The PI3K p110 delta controls T-cell development, differentiation and regulation", Biochem. Soc. Trans., 35:167-171 (2007).
Requirement for Restriction/Election Mailed Jun. 15, 2017 for U.S. Appl. No. 14/832,915 (8 pgs).
Rommel, et al., "PI3Kδ and PI3Kγ: partners in crime in inflammation in rheumatoid arthritis and beyond", Nat Rev Immunol., 7:191-201 (2007).
Sakaguchi, "Regulatory T cells: key controllers of immunologic self-tolerance", Cell, 101:455-8 (2000).
Sakaguchi, et al., "Immunologic self-tolerance maintained by activated T cells expressing IL-2 receptor α-chains (CD25). Breakdown of a single mechanism of self-tolerance causes various autoimmune diseases", J. Immunol., 155:1151-64 (1995).
Sakaguchi, et al., "Regulatory T cells and immune tolerance", Cell, 133:775-87 (2008).
Sakagushi, et al., "Foxp3$^+$ CD25$^+$ CD4$^+$ natural regulatory T cells in dominant self-tolerance and autoimmune disease", Immunol., Rev., 212:8-27 (2006b).
Sakagushi, et al., "Naturally arising Foxp3-expressing CD25$^+$CD4$^+$ regulatory T cells in self-tolerance and autoimmune disease", Curr. Top Microbial. Immunol., 305:51-66 (2006a).
Sauer, et al., "T cell receptor signaling controls Foxp3 expression via PI3K, Akt, and mTOR", PNAS, 105:7797-802 (2008).
Schmidt, et al., "Molecular mechanisms of treg-mediated T cell suppression", Front Immunol., 3:51:1-20 (2012).
Summerton and Weller, "Morpholino antisense oligomers: design, preparation, and properties", Antisense Nucleic Acid Drug Dev. 7:187-195 (1997).
Tschopp, et al., "Essential role of protein kinase Bγ (PKBγ/Akt3) in postnatal brain development but not in glucose homeostasis", Development., 132:2943-2954 (2005).
Tsiperson, et al., "Suppression of inflammatory responses during myelin oligodendrocyte glycoprotein-induced experimental autoimmune encephalomyelitis is regulated by AKT3 signaling", J Immunol., 190(4):1528-39 (2013).
Ui-Tei, et al., "Sensitive assay of RNA interference in *Drosophila* and Chinese hamster cultured cells using firefly luciferase gene as target", FEBS Lett, 479:79-82 (2000).
UniProtKB/Swiss-Prot accession No. 000329, "RecName: Full=Phosphatidylinositol 4,5-bisphosphate 3-kinase catalytic subunit delta isoform; Short=PI3-kinase subunit delta; Short=PI3K-delta; Short=PI3Kdelta; Short . . . PtdIns-3-kinase subunit delta; AltName: Full=Phosphatidylinositol 4,5-bisphosphate 3-kinase 1", 9 pages, first appeared Apr. 5, 1998, accessed Nov. 13, 2015.
Wadia, et al., "Transducible TAT-HA fusogenic peptide enhances escape of TAT-fusion proteins after lipid raft micropinocytosis", Nat Med., 10(3):310—May 2004).
Walsh, et al., "PTEN inhibits IL-2 receptor-mediated expansion of CD4$^+$ CD25$^+$ Tregs", J. Clin. Invest, 116:2521-2531. (2006).
Wender, et al., "The design, synthesis, and evaluation of molecules that enable or enhance cellular uptake: Peptoid molecular transporters", PNAS., 97(24 ): 13003-8 (2000).
Xiao, et al., "Mucosal tolerance: a two-edged sword to prevent and treat autoimmune diseases", Clin. Immunol. Immunopath., 85(2):119-28 (1997).
Yang, et al., "Protein kinase Bα/Akt1 regulates placental development and fetal growth", J. Biol. Chem., 278:32124-32131 (2003).
Ronco, et al. (Eds.), "Kidney Transplantation: Strategies to Prevent Organ Rejection". Contributions to Nephrologhy. vol. 146. S. Karger A.G. pp. 1-155 (2005).
Non-Final Rejection mailed Aug. 8, 2022 for U.S. Appl. No. 16/562,776 (18 pgs).

\* cited by examiner

Fig. 3
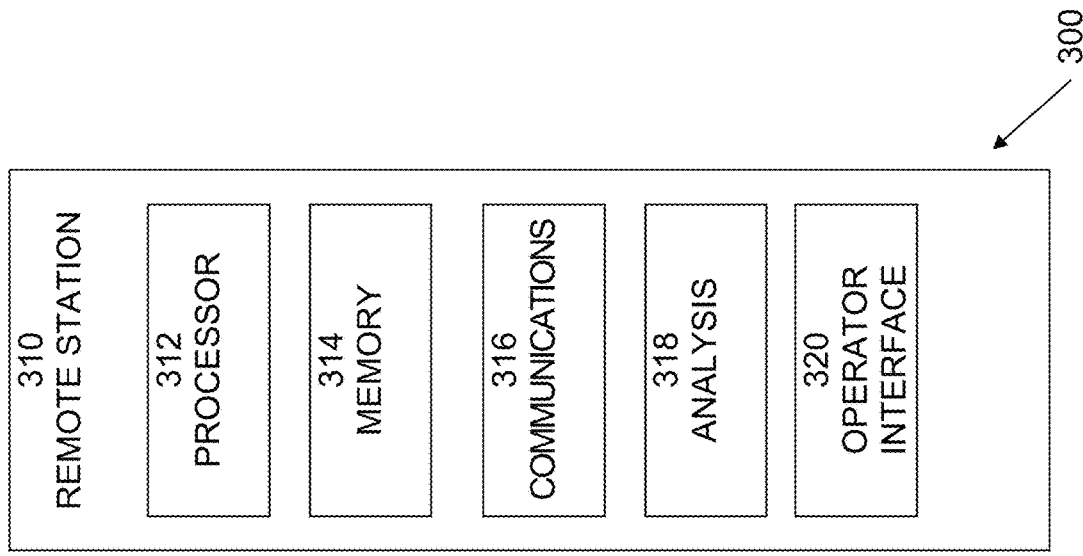
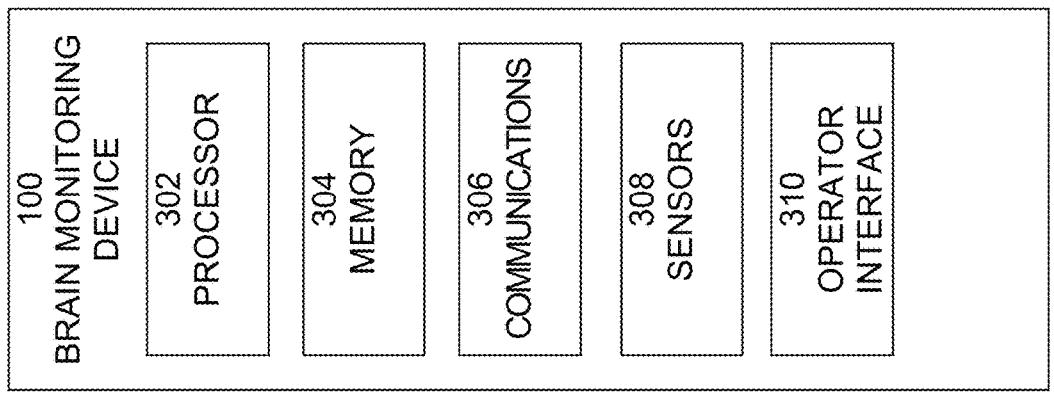

Fig. 4

| | 15 | 14 | 13 | 12 | 11 | 10 | 9 | 8 | 7 | 3 |
|---|---|---|---|---|---|---|---|---|---|---|
| | | CONSCIOUS – INTERACT W/ ENVIRONMENT | | | | | | UNCONSCIOUS | | |
| EYE | SPONTANEOUS OPENING | | OPENS TO STIMULUS | | OPENS TO NOXIOUS AUD. | | NOT RESPONSIVE | | ROVING OR FIXED GAZE | |
| VERBAL | NORMAL CONVERSATION | | DISORIENTED | | MUMBLING | | SOUNDS ONLY | | NO SOUND OBSTRUCTION | |
| MOTOR | FOLLOW COMMANDS | | | | | | POSTURES OR SEIZURES | | | |
| MONITOR | VIDEO | | | | | | | | | |
| | CAMERA | | | | | | | | | |
| | MICROPHONE | | | | | | | | | |
| | SPEAKER | | | | | | | | | |
| | | | | | | | TCD | | | |
| | | | | | | | EEG | | | |
| | | | | | | | | ONS | | |

METHOD AND SYSTEM FOR MONITORING BRAIN FUNCTION AND INTRACRANIAL PRESSURE

CROSS REFERENCE TO RELATED APPLICATIONS

This application claims benefit of and priority to U.S. Provisional Patent Application No. 62/728,175 filed on Sep. 7, 2019, which is incorporated by reference in its entirety.

BACKGROUND OF THE INVENTION

The present invention relates to techniques for improved, automated monitoring of brain function and intracranial pressure.

Brain function can be divided into higher levels of consciousness (cortical brain function) such as awareness, comprehension, and understanding of situation and environment, and lower levels of consciousness (subcortical functions), such as breathing and maintenance of heart rate and blood pressure. Traditionally the assessment of brain function after head injury (traumatic brain injury) or multisystem trauma is gauged using the Glasgow Coma Scale (GCS). The GCS utilizes testing of a patient's consciousness by measuring the verbal, motor and ocular responses to stimuli. At the highest level, the patient interacts with the environment and is oriented to their situation. As brain function declines, the patient loses the ability to maintain awareness of the environment and requires increased stimuli to elicit a reaction such as responding to pain or following verbal commands. At the lowest level (GCS 3), the patient does not respond to stimuli from the environment. The GCS, though crude, does assess brain function and allows a healthcare provider to measure and subsequently monitor changes in function over time. This system also guides the healthcare provider in the triage of multiple patients, such as in a multi-casualty situation, and in the prioritization of diagnostic testing or therapeutic intervention for an individual, such as endotracheal intubation in the patient with a GCS of 8 or lower. As such the GCS has value in gross brain measurement and monitoring.

Intracranial pressure (ICP) has an important and critical interaction with brain perfusion. This is an inverse relation in that as the ICP increases the cerebral perfusion decreases. There are brain protective reflexes (autoregulation) which can ameliorate this association, but only up to a point. Further, the point at which autoregulation fails and the brain perfusion drops precipitously with any increase in ICP is different for individual patients, being affected by factors such as genetics, prior history of brain injury, current circumstances such as medication use or ongoing invasive procedure, age, sex and race. Thus, being able to monitor the ICP is useful for a wide variety of reasons during medical practice, such as during surgical operations, post injury brain function assessment, critical care transport of an injured patient, procedural sedation for medical procedures, etc.

Currently, ICP monitoring where small changes in ICP can be accurately measured can only be performed invasively by placing an intracranial monitoring device into the brain parenchyma or using a needle or catheter placed in the intraspinal space. Typically the best monitoring of the ICP in a continuous fashion is done with the intracranial monitoring device. Other methods of estimating the ICP can be done non-invasively, however, the ICP measurements by these methods are not sensitive to small and moderate changes in the ICP. For example, traditional ultrasound can be used to measure the optic nerve sheath (ONS) diameter which is directly proportional to the ICP. However, this can only detect dramatic changes in the intracranial pressure. This would not be useful in measuring the ICP in normal (brain) patients, and further can only be done intermittently and requires a clinician interpretation.

Accordingly, a need arises for techniques that may provide improved, automated monitoring of brain function and intracranial pressure.

SUMMARY OF THE INVENTION

Embodiments of the present systems and methods may provide improved, automated monitoring of brain function. In embodiments, a multimodal, multi-sensor monitoring device may provide monitoring of the full spectrum of brain function. In embodiments, the device may be a light-weight, portable, telemedicine device that provides automatic monitoring during situations where a healthcare provider cannot maintain constant or interval monitoring of patient brain function, such as in critical care transport, mass casualty situations, or during therapeutic procedures. In embodiments, the device may utilize different testing modalities to determine a level of brain function and then monitor for changes. Sensory data may be automatically analyzed and synthesized, calculating a Brain Function Score (similar to GCS) and giving a rapid reference as to the overall brain function. This data may be both graphically displayed, providing easy visualization and interpretation by a health care provider, and transmitted to a receiving station where multiple patients can be monitored simultaneously. As changes in mental status occur, such as a deterioration in the level of patient consciousness, the healthcare provider is notified and analyzes the patient for conditions that may be modified in order to optimize brain perfusion and oxygenation, thereby lessening secondary injury from brain trauma. As the device is performing the measurement and deriving the data (ICP or brain function score) in a uniform manner for all patients in a cohort, the measurements may provide for generalizability across the cohort of patients. This may improve triage and patient selection for therapy based on individual need and available resources.

Embodiments of the present systems and methods may utilize a novel set of sensors and patient-interactive stimuli to render a Global Brain Function Score (GBS.) The GBS may be considered a corollary to the GCS, utilizing a composite score equivalent to the GCS (15-3), allowing for easier adoption and interpretation by healthcare providers. The composite GBS score may be displayed on the device as well as transmitted wirelessly to a remote monitoring station. To calculate the GBS, embodiments may utilize a variety of sensors and patient stimuli to assess the interactivity of the patient with their environment. The type of stimuli and the sensors used may vary based on the consciousness level of the patient, utilizing "Cognizance Stimuli-Sensors" with higher levels of brain function and "Physiologic Sensors" and "Advanced Monitoring" sensors as brain function declines. For example, once the patient becomes unconscious, or at any time as determined by the healthcare provider, Advanced Monitoring sensors, such as Transcranial Doppler (TCD), Electroencephalograph (EEG), and Intracranial Pressure (ICP) monitoring may be performed.

In embodiments, parameters such as the optic nerve sheath diameter (ONSd), volume, surface structure, radial variation, circumference, etc., may be measured and serially monitored as a non-invasive measure of intracranial pressure (ICP). The optic nerve sheath parameters may be monitored both as an indication of ICP, but also to measure the impact or effects of interventions on the ICP. Embodiments may provide real-time, non-invasive intracranial pressure monitoring, continuously and in an automated fashion. In embodiments, a 3D image of the optic nerve sheath (ONS) may be obtained and utilized as a non-invasive measure of small changes in the ICP. Embodiments may utilize a matrix type transducer with steerable acoustic elements. This allows for the ultrasound beam to be steered across the optic nerve sheath. Utilizing the method described in U.S. Patent Application Publication No. 2016/0000367, the volume, variation in radius, variation in diameter, variation in the circumference, or variation in the 3D surface geometry may be utilized to calculate the ICP. This may be done serially, up to several times a second, to provide a second to second calculation of the ICP.

In an embodiment, a system for monitoring brain function of a subject includes an apparatus for mounting a plurality of stimulus devices and a plurality of response sensors on a head of the subject, the plurality of stimulus devices including at least one cognizance stimulus device selected from a group of cognizance stimulus devices consisting of a speaker to provide auditory stimuli to the subject and a display to provide visual stimuli to the subject, and the plurality of response sensors including at least one cognizance sensor selected from a group of cognizance sensors consisting of a microphone to record sounds made by the subject, a camera to record eye position and movement of the subject, and a touch/motion sensor to receive input from the subject, a processor and memory for executing and storing program instructions to provide stimuli to the subject using the plurality of stimulus devices, to receive responses of the subject recorded by the plurality of response sensors, and to process the received responses to generate response information, and a display to display the response information.

In embodiments, the system may further include communications circuitry to transmit the received responses and generated response information and to receive information relating to stimuli to be provided to the subject. The plurality of sensors may further include at least one physiological sensor selected from a group of physiological sensors comprising a vibration sensor, a heart rate monitor, a blood oxygen saturation sensor, a temperature sensor, a head position sensor, and a vibration microphone. The system may further include at least one of a transcranial Doppler device, an electroencephalograph monitor device, and an optic nerve sheath diameter measurement device.

In an embodiment, a system for measuring optic sheath diameter includes a two-dimensional array of ultrasonic transducers to scan across the optic nerve sheath, a processor in communication with the ultrasonic transducer for receiving and processing data obtained from the two-dimensional array of ultrasonic transducers, wherein the processor calculates the volume of segments of an optical nerve of a subject and optionally produces a three dimensional image of the optical nerve on a graphical display in communication with the processor. The processer may contain an algorithm calculating the volume of segments of the optic nerve. The two-dimensional array of ultrasonic transducers may comprise lights for aligning the transducer with the optic nerve sheath.

BRIEF DESCRIPTION OF THE DRAWINGS

The details of the present invention, both as to its structure and operation, can best be understood by referring to the accompanying drawings, in which like reference numbers and designations refer to like elements.

FIG. 3 is an exemplary block diagram of an embodiment of a system incorporating a brain monitoring device, according to the present systems and methods.

FIG. 4 is an exemplary diagram of function conditions and sensors that may be used to monitor brain function at each condition, according to the present systems and methods.

DETAILED DESCRIPTION OF THE INVENTION

Figure 1:
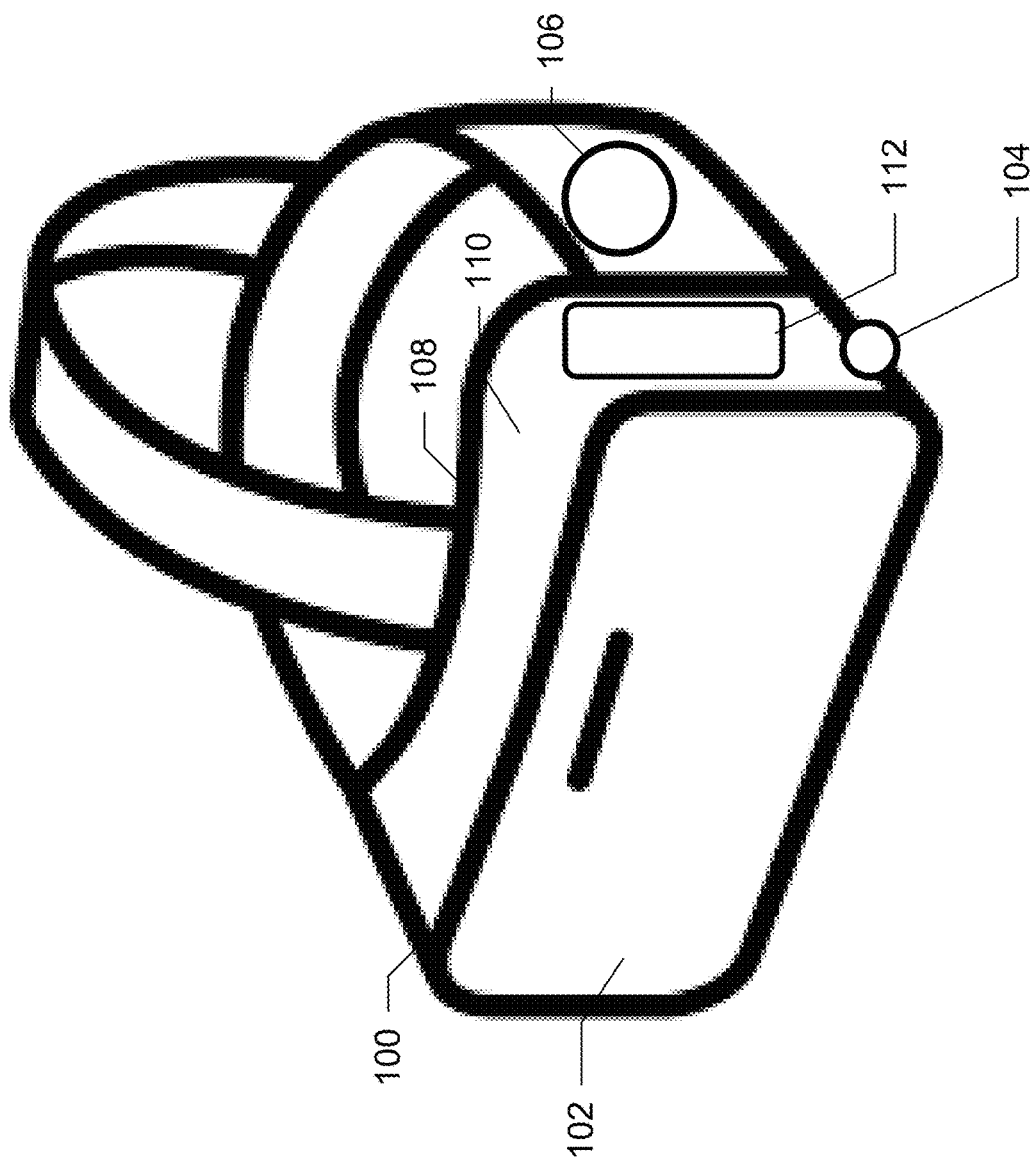
FIG. 1 illustrates an exemplary embodiment of a brain monitoring device, according to the present systems and methods.

Embodiments of the present systems and methods may provide improved, automated monitoring of brain function. In embodiments, a multimodal, multi-sensor monitoring device may provide monitoring of the full spectrum of brain function. In embodiments, the device may be a light-weight, portable, telemedicine device that provides automatic monitoring during situations where a healthcare provider cannot maintain constant or interval monitoring of patient brain function, such as in critical care transport, mass casualty situations, or during therapeutic procedures. In embodiments, the device may utilize different testing modalities to determine a level of brain function and then monitor for changes. Sensory data may be automatically analyzed and synthesized, calculating a Global Brain Function Score (GBS) (similar to GCS) and giving a rapid reference as to the overall brain function. This data may be both graphically displayed, providing easy visualization by a health care provider, and transmitted to a receiving station where multiple patients can be monitored simultaneously. As changes in mental status occur, such as a deterioration in the level of patient consciousness, the healthcare provider is notified and analyzes the patient for conditions that may be modified in order to optimize brain perfusion and oxygenation, thereby lessening secondary injury from brain trauma. As the device is performing the measurement and deriving the data (ICP or brain function score) in a uniform manner for all patients in a cohort, the measurements may provide for generalizability across the cohort of patients. This may improve triage and patient selection for therapy based on individual need and available resources.

Embodiments of the present systems and methods may utilize a novel set of sensors and patient-interactive stimuli to render a Global Brain Function Score (GBS.) The GBS may be considered a corollary to the GCS, utilizing a composite score equivalent to the GCS (15-3), allowing for easier adoption and interpretation by healthcare providers. The composite GBS score may be displayed on the device and transmitted wirelessly to a remote monitoring station. To calculate the GBS, embodiments may utilize a variety of sensors and patient stimuli to assess the interactivity of the patient with their environment. The type of stimuli and the sensors used may vary based on the consciousness level of the patient, utilizing "Cognizance Stimuli-Sensors" with higher levels of brain function and "Physiologic Sensors" and "Advanced Monitoring" sensors as brain function declines. For example, once the patient becomes unconscious, or at any time as determined by the healthcare provider, Advanced Monitoring sensors, such as Transcranial Doppler ultrasound (TCD), Electroencephalograph (EEG), and Intracranial Pressure (ICP) monitoring may be performed.

Embodiments of the present systems and method may provide the capability for cognitive monitoring during transport, and may function in austere environments with loud ambient noise and in darkness. Embodiments may provide broad monitoring functions of brain function corresponding to GCS 15 to 3 and may provide multi-modal sensors with telemedicine transmission of data. In embodiments, components may include monitoring of higher cognitive functions using one or more of a digital video screen to display visual stimuli to a patient, a noise canceling microphone to monitor for patient sounds and ambient sounds, an In-ear speaker to provide auditory commands and stimuli to the patient, a camera for eye tracking, adjunct sensors, such as one or more of a vibration sensor to accept tactile input from the patient and to cancel out environmental vibrations to other sensors, an intra-auricular temperature monitor, a heart rate sensor, an oxygen saturation sensor, a position sensor/gyroscope to monitor head elevation and rotation of the patient, and automatic lower cognitive function monitoring using one or more of a TCD Ultrasound to auto-locate and auto-Doppler the Middle Cerebral Artery for brain blood flow, an EEG Monitor to monitor EEG signals for brain function/seizures, and ICP measurements, such as those obtained from measurement of Optic Nerve Sheath parameters. In embodiments, brain function may be monitored on a spectrum from higher brain function to lower brain function, such as reflexes. Higher brain functions may be monitored by patient cognition, such as the ability to follow commands. Higher cognitive function monitoring may include visual stimulus, such as words to read and instructions, displayed on a screen, such as "read this sentence." A microphone may pick up the speech for analysis. If the patient is able to read as instructed, then the brain function may be determined to be in the normal range. Embodiments may monitor for speech and cadence so changes may be monitored over time. If a patient is unable to speak, a camera may monitor pupil location and movement. Visual stimuli may be displayed in various locations on the screen to evaluate for interaction with the stimulus. Audio may provide a method for stimulating the patient as mental status declines.

In embodiments, adjunct sensors may be used to optimize the patient environment to protect from brain injury. For example, a position sensor/gyroscope may sense that the head is not elevated and head elevation may be recommended. A temperature monitor may sense hypothermia and warming may be recommended. A blood oxygenation sensor may sense hypoxia and oxygenation/intubation may be recommended. In embodiments, some sensors may be used as both main sensors and as adjunct sensors. For example, a microphone may also be used to monitor for airway obstruction, a camera may also be used to monitor for eye deviation and seizure, and a vibration sensor may also be used to monitor to remove background vibration artifacts from other sensors' signals.

Embodiments of the present systems and methods may be used, for example for military transport, multi-casualty events, intraoperative monitoring and patient comfort, and procedural sedation monitoring.

As brain function decreases, lower brain functions may be evaluated to determine the amount of change in brain function and rapidity of change. As all higher brain functions decrease or cease, advanced monitoring may begin, such as TCD and EEG monitoring. Once unconscious, direct, non-invasive measurement may begin, such as ICP measurement.

In embodiments, parameters such as the optic nerve sheath diameter (ONSd), volume, surface structure, radial variation, circumference, etc., may be measured and serially monitored as a non-invasive measure of intracranial pressure (ICP). The optic nerve sheath parameters may be monitored both as an indication of ICP, but also to measure the impact or effects of interventions on the ICP. Embodiments may provide real-time, non-invasive intracranial pressure monitoring, continuously and in an automated fashion. In embodiments, a 3D image of the optic nerve sheath (ONS) may be obtained and utilized as a non-invasive measure of small changes in the ICP. Embodiments may utilize a matrix type transducer with steerable acoustic elements. This allows for the ultrasound beam to be steered across the optic nerve sheath. Utilizing the method described in U.S. Patent Application Publication No. 2016/0000367, the volume, variation in radius, variation in diameter, variation in the circumference, or variation in the 3D surface geometry may be utilized to calculate the ICP. This may be done serially, up to several times a second, to provide a second to second calculation of the ICP.

Figure 2:
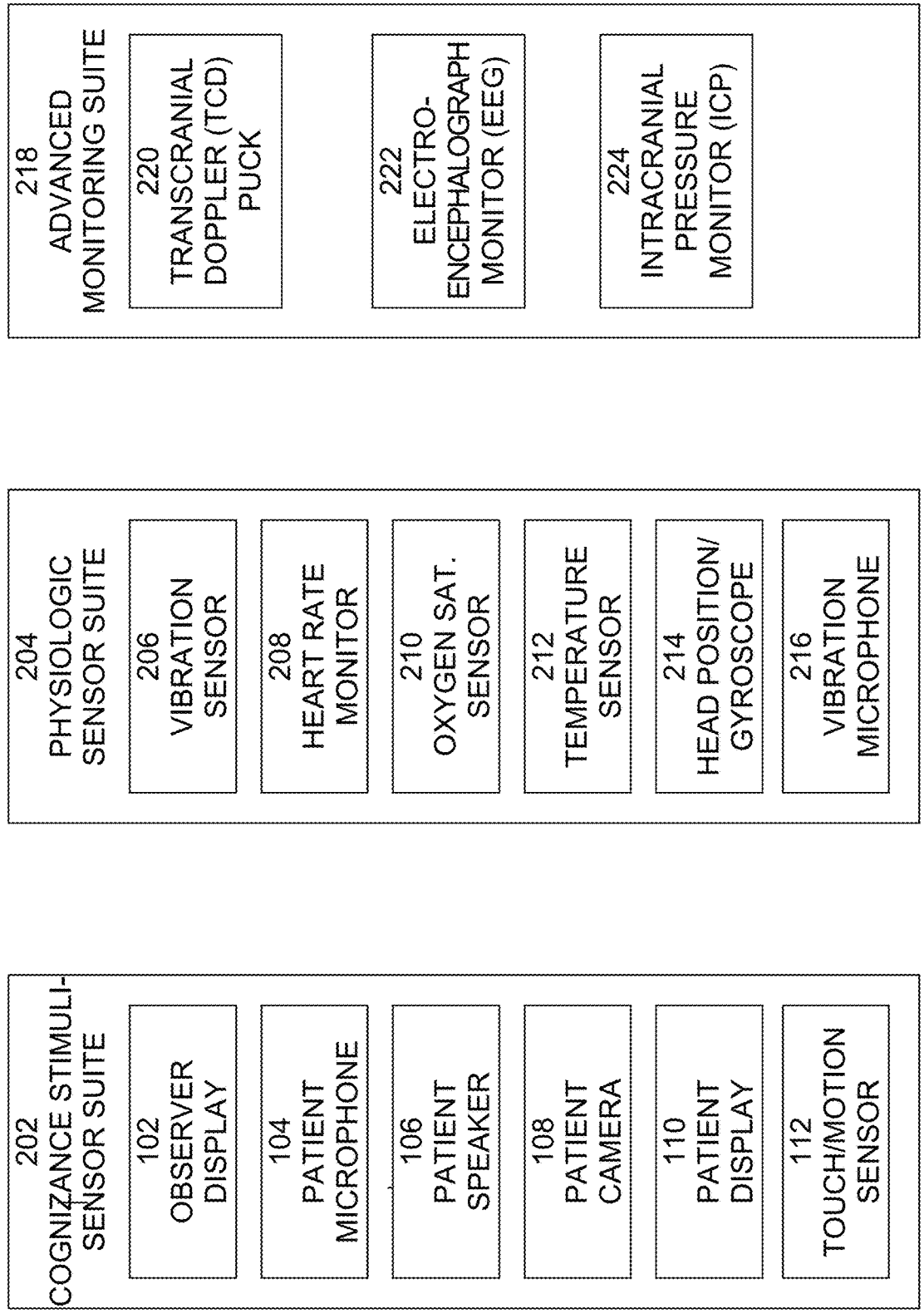
FIG. 2 shows exemplary block diagram of embodiments of a brain monitoring device, according to the present systems and methods.

An exemplary embodiment of a brain monitoring device 100, according to the present systems and methods, is shown in FIG. 1. Brain monitoring device 100 may include a wearable platform—the goggles—including, for example, observer display screen 102, patient microphone 104, in-ear speaker 106, "eye camera" 108 capable of tracking eye movements, patient video screen 110 and touch/motion sensor 112. These components are part of the "Cognizance Stimuli-Sensor" suite, as shown in FIG. 2, which may be included in embodiments of the present systems and methods. This suite may be used to stimulate, monitor, and gauge the patient's level of consciousness. At the highest levels of consciousness, patients are able to interact with the stimuli provided visually by patient screen 110 or auditorily by speaker 106. The stimuli can be simple (look at the right side of the screen) or complex (look at the left side of the screen after looking to the right or blink twice and look up) to evaluate the level of cognizance.

Responses may be measured by tracking eye movements with patient camera 108 or by the patient responding verbally to provocative stimuli (read the sentence on the screen aloud) as picked up by microphone 104. Patient camera 108 can detect pupillary constriction and dilation, helping to determine if the patient is able to focus on a displayed image on screen 110. There are advantages for using multiple patient senses for the detecting interaction with the stimulus environment. Patients may have multiple injuries, affecting one or more of their senses. For example, the patient may have an eye injury but still be able to talk or the patient may have ruptured ear drums after a blast injury. Embodiments primarily use visual and auditory stimuli, but if these modalities are not possible, touch/motion sensor 112 may be utilized to have the patient interact by touch with the goggles. The results of such interaction with the stimulus environment may be displayed on observer display screen 102 and/or transmitted to external processing and display equipment.

As brain function declines and the patient loses the ability to follow commands, first complex commands and then simple, the "Physiologic Sensor" suite 204 may engage. Physiologic Sensor Suite 204 may monitor both the patient and the environment to evaluate lower levels of brain function—lower GBS—and to aid the healthcare provider in optimizing the patient environment for brain protection. The Physiologic Sensor helps the healthcare provider optimize brain protection strategies to prevent secondary brain injury. Physiologic Sensor Suite 204 may include sensors such as:

One or more vibration sensors 206 may detect both background vibration (which will be encountered during transport), as well as monitoring for seizures or tonic movements (decorticate and decerebrate posturing).

One or more heart rate monitors 208 may be used to measure autonomic function (beat to beat variability—lost as autonomic function declines), onset of a Cushing response to elevations in intracranial pressure, and tachycardia which may indicate hemodynamic compromise which may affect brain function (hemorrhagic shock).

One or more oxygen saturation sensors 210 may help to optimize blood oxygenation (critical in brain protection strategies), while also providing an adjunct method of monitoring for cerebral events such as seizure.

One or more in-ear temperature monitors 212 may aid in helping monitor for the optimal brain-protection environmental modifications.

One or more head position and gyroscope monitors may aid in maintaining head neutral position (brain protection strategy) as well as assisting in detection of seizures and posturing.

One or more vibration microphones 216 may aid in monitoring verbal responses to commands in a noisy environment as well as monitoring for airway obstruction—which is a sign of decreasing mental status and a factor which must be corrected in a brain protection strategy.

Embodiments may include "Advance Monitoring" suite 218, which may include auto-optimizing transcranial Doppler (TCD) puck 220, electroencephalograph monitor (EEG) 222 and intracranial pressure monitor (ICP) monitor 224. Advanced Monitoring suite 218 may be utilized once brain function has started to decline. The included sensors may operate in an "operator-less" fashion, requiring no assistance from the health care provider. These sensors are most critical once the patient develops a decreased level of consciousness (unconscious), and stops interacting with the other sensors. EEG and ultrasound are non-invasive monitors which give a better idea of brain function that may not be possible in any other way.

TCD Puck 220 may include a non-imaging ultrasound-based device that may automatically identify the middle cerebral artery (MCA) and may determine the MCA blood flow velocity and other brain arterial hemodynamics. TCD monitoring of the MCA has been shown to be a measure of brain function and injury (TBI). TCD Puck 220 may intermittently interrogate the MCA flow, giving a time-based measurement of brain function. The data collected by TCD Puck 220 is not comprehensive, but is focused on measures which relate to changes in intracranial pressure (ICP). These measures may include MCA hemodynamic measures such as but not limited to Peak Velocity, Resistive Index, and Mean Velocity.

EEG monitor 222 measures brain waves. While traditional EEG utilizes many electrodes for precisely evaluating brain waves for diagnosis of multiple conditions, the EEG monitor utilized in embodiments of the present systems and methods may be simplified, using fewer electrodes, to achieve the goal of detecting subclinical seizure activity. Subclinical seizures present as seizures without obvious muscle shaking) and may occur after a head injury. If not treated in a timely fashion, they can lead to secondary brain injury.

Ultrasound (US) (ICP) monitor 224 may be used to noninvasively measure the optic nerve sheath parameters in multiple planes. For example, the optical nerve sheath diameter (ONSd) increases with increasing intracranial pressure and is an outstanding noninvasive measure in the unconscious patient who has suffered a brain injury. In the conscious patient, the ONSd and other optic nerve sheath parameters, such as volume, surface structure, radial variation, circumference, etc., may be useful for determining normal versus elevated ICP and the measurement may be done at any time by placing US ICP monitor 224 on the patient's closed eye to obtain a reading. Once the patient is unconscious, US ICP monitor 224 may be attached to the device frame and placed on the eye in continuous contact. Once attached in the device, optic nerve sheath parameter measurements may be done routinely for frequent or constant monitoring of optic nerve sheath parameter changes. US ICP monitor 224 may be a non-imaging ultrasound based monitor, capable of taking frequent measurements and averaging the measurements to account for errors in measurement and vibration. As the ICP and the optic nerve sheath parameters change, the healthcare provider may be notified of the change in this measurement advising them what parameters (such as head position) can be modified to decrease the ICP. Using US ICP monitor 224, the healthcare provider can monitor the effect of their interventions on the patient's ICP. US ICP monitor 224 is described further below.

An exemplary block diagram of a system 300 incorporating device 100 is shown in FIG. 3. In this example, system 300 may include brain monitoring device 100 and remote station 310. Brain monitoring device 100 may include processor 302, memory 304, communications circuitry 306, sensors 308, and operator interface 310. Processor 302 and memory 304 may implement a computing device, such as a microprocessor, embedded processor, system on a chip, etc. Communications circuitry may provide communications functionality using any wired or wireless, standard or proprietary communications system or protocol. Such communications may be directly with remote station 310, or may be via one or more intermediate networks, such as a local area network, a wide area network, the Internet, etc. Sensors 308 may include cognizance stimuli-sensor suite 202, physiologic sensor suite 204, and advanced monitoring suite 218, as described above. Operator interface 310 may include operator display 102, described above, as well as other input and/or output components that may provide the capability for operator control of brain monitoring device 100.

Remote station 310 may include processor 312, memory 314, communications circuitry 316, analysis software 318, and user interface 320. Processor 302 and memory 304 may implement a computer system, such as a programmed general-purpose computer system, such as a microprocessor, embedded processor, system on a chip, personal computer, workstation, server system, and minicomputer or mainframe computer, or distributed, networked computing environments, etc. Communications circuitry may provide communications functionality using any wired or wireless, standard or proprietary communications system or protocol. Such communications may be directly with brain monitoring device 100, or may be via one or more intermediate networks, such as a local area network a wide area network, the Internet, etc. Remote station 310 may further communicate with other systems as well. Analysis software 318 may receive data from brain monitoring device 100, process and analyze the data so as to be useful to a health care provider or other user or operator, and may display the resulting analysis, using for example display capabilities in user interface 320. Remote station 310 may further communicate analysis results with other systems. Operator interface 310 may include a display as well as other input and/or output components that may provide the capability for operator control of brain monitoring device 100 and remote station 310.

In embodiments, the sensors may work in a coordinated fashion—each providing a unique piece of information to calculate the GBS. The sensor suites may be utilized only when needed. This saves energy as well as complexity in design. All of the sensors may be built into the device 100 platform. This allows the healthcare provider to place device 100 onto the patient and not be concerned with exact placement of multiple sensors. This allows for standardization of the sensors, as precise distance between the monitors can allow for a more reliable interpretation of the sensor data. Vibration sensors may be incorporated into brain monitoring device 100 to help with removing noise from the data signals. The vibration signals may be removed from the various sensor data streams. Calculations may be done by processor 302 incorporated into brain monitoring device 100. Processor 302, as well as other circuitry, may be housed behind observer display 102, which may be used to display the GBS, a color-coded patient condition status (Green, Yellow, Red), and other important physiologic data which the healthcare provider can utilize as they treat the patient bedside. An integrated telemetry module, such as communications circuitry 306, may wirelessly stream the data to any platform, such as remote station 310, allowing for remote monitoring of a single or multiple patients simultaneously.

An example of brain function conditions and sensors that may be used to monitor brain function at each condition is shown in FIG. 4.

Figure 5:
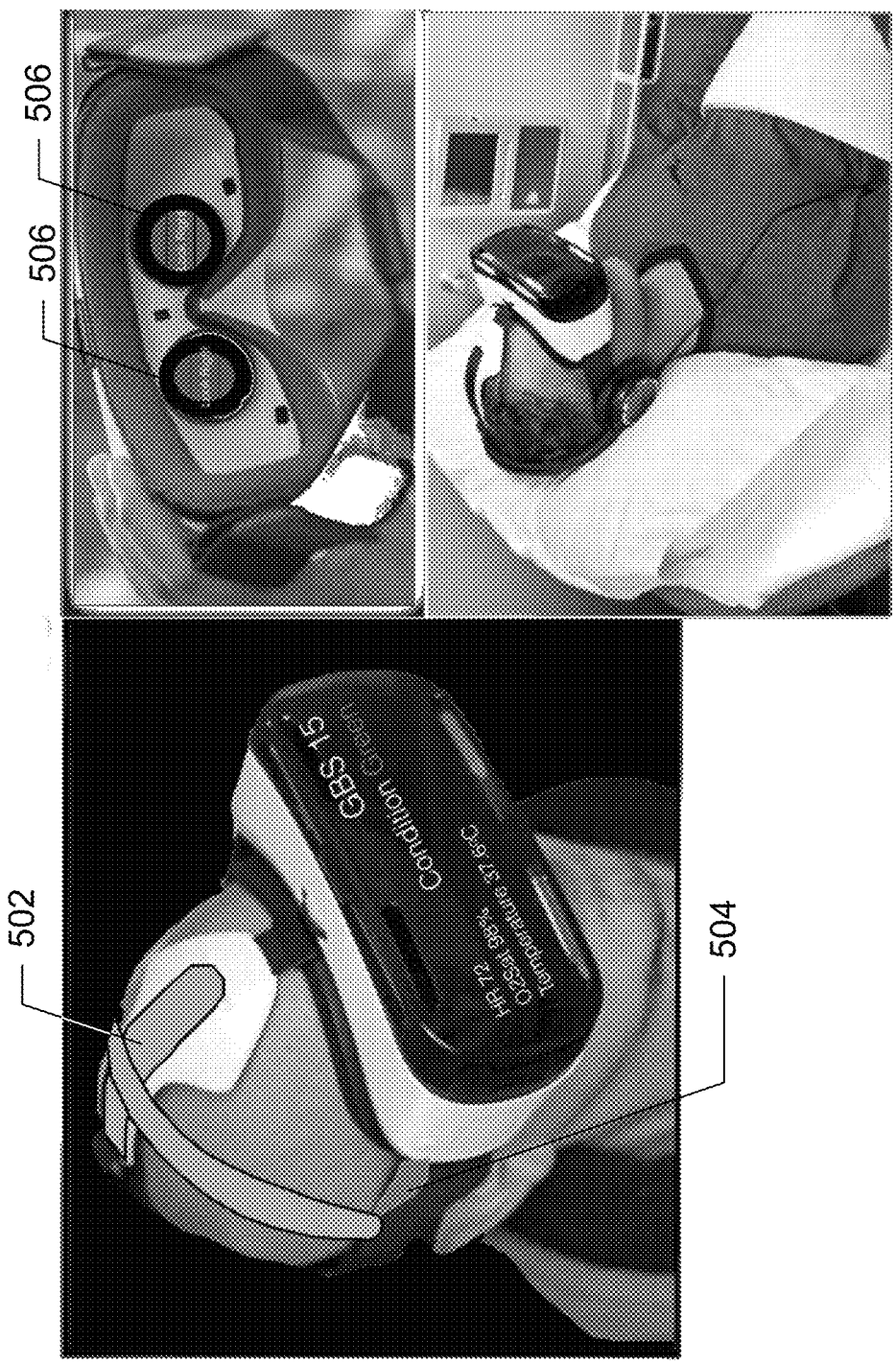
FIG. 5 is an exemplary illustration of an embodiment of a brain monitoring device, according to the present systems and methods.

An example of an embodiment of a brain monitoring device 100 is shown in FIG. 5. In this example, EEG lead location 502 and TCD puck location 504 are shown. Also shown are patient video screens 506.

Embodiments of the present systems and method may be used to provide critical care monitoring of brain function in a hostile environment. The sensors may be tuned to remove or exclude environmental noise in the data signal. This allows for embodiments to function during patient transport such as helicopter evacuation and mass casualty events. Embodiments may be used in other healthcare situations such as during procedures such as surgery (intraoperative monitoring) and procedural sedation.

Figure 6:
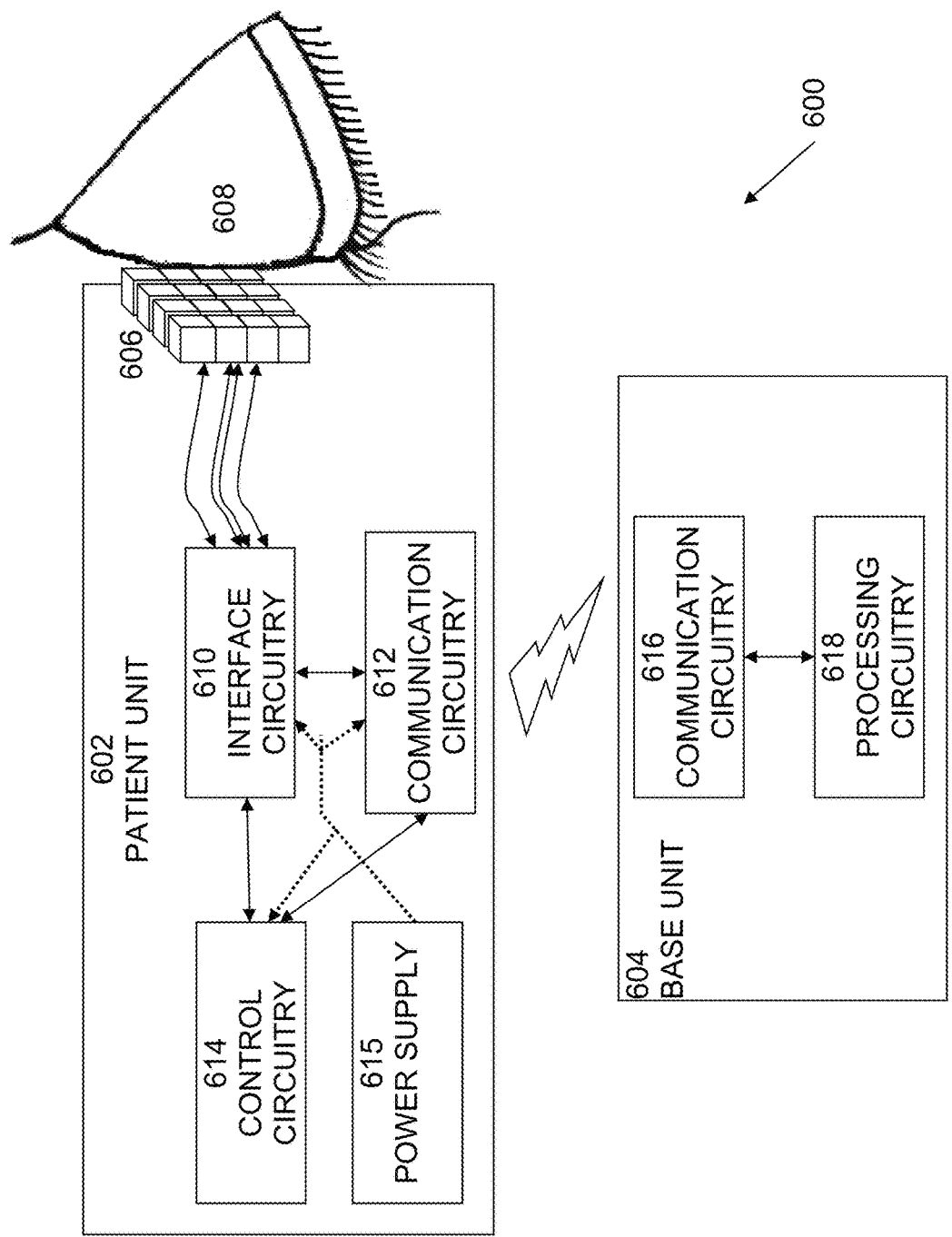
FIG. 6 is an exemplary block diagram of an embodiment of an intracranial pressure (ICP) monitor, according to the present systems and methods.

An exemplary embodiment of an intracranial pressure (ICP) monitor 224 is shown in FIG. 6. In embodiments, monitor 224 may be incorporated in or attached to brain monitoring device 100. In embodiments, monitor 224 may be a standalone device, or may be incorporated in other devices or systems.

As shown in this example, monitor 224 may include a patient unit 602 and a base unit 604. Patient unit 602 may include a two-dimensional matrix array of ultrasound transducers 606 that are placed in contact with an eye 608 of a patient. Ultrasound array 606 may be any standard or proprietary two-dimensional array of ultrasound transducers. Each transducer in array 606 may be connected to interface circuitry 610, which may provide electrical signals to cause each transducer to emit an ultrasonic signal into eye 608, and may receive electrical signals from each transducer corresponding to the return or echo ultrasonic signal from eye 608. Interface circuitry 610 may include analog circuitry to transmit electrical signals to array 606 and to receive electrical signals from array 606. Interface circuitry 610 may include analog-to-digital converter circuitry (ADC) to convert received analog signals to digital signals and may include digital-to-analog converter circuitry to convert digital signals to transmitted analog signals. Interface circuitry 610 may further include digital circuitry to generate the signals to be transmitted and digital circuitry to process the digital signals converted from the received analog signals.

Interface circuitry 610 may be connected to communication circuitry 612, which may transmit and receive signals between patient unit 602 and base unit 604. Both interface circuitry 610 and communication circuitry 612 may be connected to control circuitry 614, which may control the operation of interface circuitry 610 and communication circuitry 612. Power supply 615, which may be a battery, mains power converter, inductively-coupled supply, etc., may supply power to the components of patient unit 602.

Ultrasound array 606 may be placed in contact with patient eye 608 and held in place using any means of attachment. Ultrasound array 606 may perform its functions with the eyelid of eye 608 closed. Accordingly, array 606 may, for example, be affixed to the eyelid of eye 608 using a mild adhesive, mechanical means, such as an elastic or inelastic strap or band, etc. In embodiments, array 606 may be attached in place and may connect using wired or wireless connections to the remainder of patient unit 602. In embodiments, patient unit 602 may be small enough that the entire patient unit 602 may be attached in place. Such embodiments are a matter of engineering design.

Base unit 604 may include communication circuitry 616, which may communicate with communication circuitry 612 in patient unit 602, and processing circuitry 618, which may process the signals from patient unit 602 to compute an ICP result and other associated data. Processing circuitry 618 may include one or more computing systems, such as personal computers, work stations, smartphones, etc., which may include or be connected to one or more display devices, such as a monitor, display screen, etc. The communication techniques used may be proprietary communications techniques, as well as standard communications techniques, such as WiFi, BLUETOOTH®, cellular carrier networks such as 3G, 9G, LTE, etc. In such embodiments, base unit 604 may comprise the computing system, such as a personal computer, work station, smartphone, etc.

Figure 7:
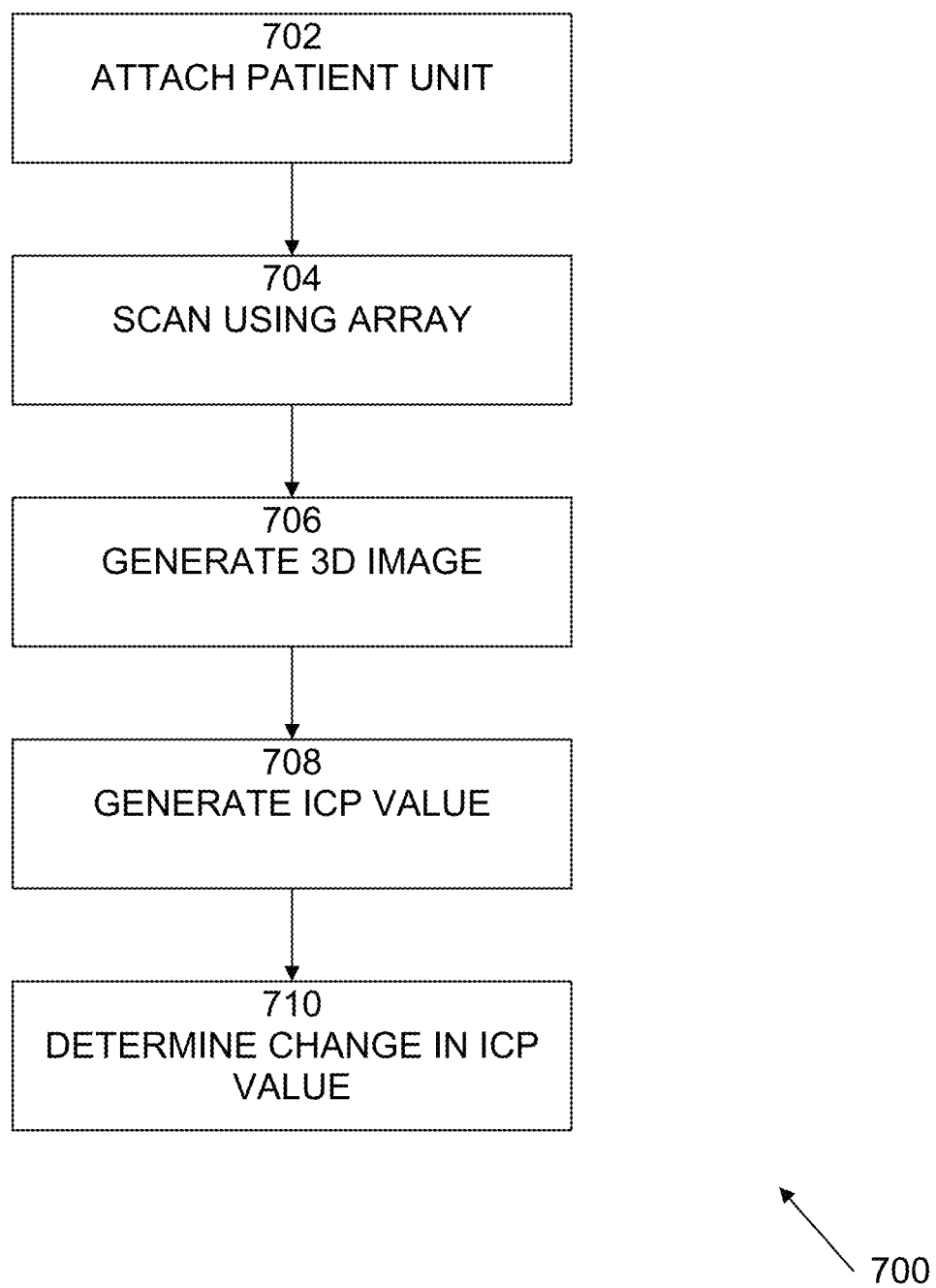
FIG. 7 is an exemplary flow diagram of a process of ICP measurement, according to the present systems and methods.
Figure 8:
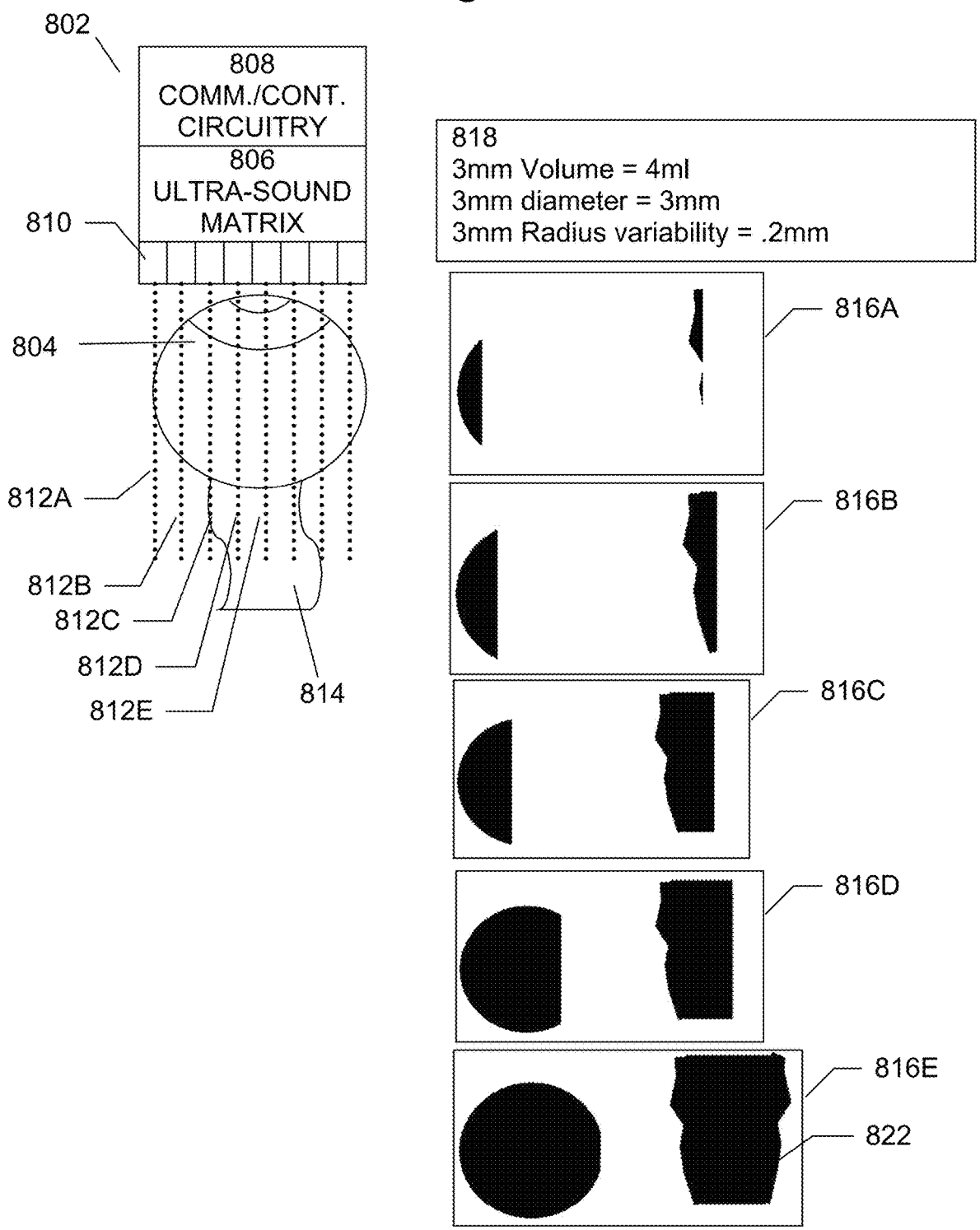
FIG. 8 is an exemplary diagram illustrating the operation of an ICP measurement system, according to the present systems and methods.

An exemplary flow diagram of a process 700 of ICP measurement is shown in FIG. 7. It is best viewed in conjunction with FIG. 8, which is an exemplary diagram illustrating the operation of an ICP measurement system. Process 700 begins with 702, in which a patient unit 802 may be brought into contact with an eye 804 of a patient. As described above, patient unit 802 may be attached or affixed to a patient using an adhesive, strap, etc., with ultra-sound matrix array 806 in contact with a closed eyelid of the patient. Patient unit 802 may include array 806 and communication and control circuitry 808. In FIG. 8, each row 810 of ultrasound transducers in array 806 is shown in an end view. Each box, such as 810, represents a row of transducers, not just a single transducer.

At 704, communication and control circuitry 808 may control each row 810 of ultrasound transducers in array 806 to perform an ultrasound scan 812A-E of a slice of eye 804 and optic nerve sheath 814. For example, scan 812A may generate an image 816A of a slice of eye 804 and optic nerve sheath 814. Likewise, scans 812B, 812C, 812D, and 812E may generate images 816B, 816C, 816D, and 816E, respectively. The slices may be scanned sequentially or in any other suitable order. As shown in FIG. 8, a number of parameters 818 of the optic nerve sheath 814 may be determined. For example, the diameter of the optic nerve sheath may be determined from one or more of the slice images 816A-E. For example, image 820 may be used to determine the diameter of optic nerve sheath 814. In the example shown in FIG. 8, the diameter of optic nerve sheath 814 at a distance of 3 mm behind the retina of eye 804 is 3 mm. Likewise, image 820 and image 822 may be used together to determine the volume of optic nerve sheath 814. In the example shown in FIG. 8, the volume of optic nerve sheath 814 at a distance of 3 mm behind the retina of eye 804 is 4 ml. Another example of a parameter that may be determined is the variability of the radius of optic nerve sheath 814 at a distance of 3 mm behind the retina of eye 804 is 0.2 mm. The process of determination of these parameters is described in more detail in U.S. Patent Application Publication No. 2016/0000367.

At 706, the images 816A-E of the slices may be combined to form a three-dimensional (3D) image of optic nerve sheath 814, as described in U.S. Patent Application Publication No. 2016/0000367. At 708, the 3D image of optic nerve sheath 814 may be used to generate an ICP value, as described in U.S. Patent Application Publication No. 2016/0000367.

At 710, a change in the ICP value may be determined. The above-described technique may be most advantageous when determining a change in ICP, rather than an absolute value of ICP. Relatively small changes in ICP may be detected, as described in U.S. Patent Application Publication No. 2016/0000367. Further, the 3D image of optic nerve sheath 814 may be used to determine the presence or absence of traumatic brain injury (TBI), and to characterize the TBI of the patient, as described in U.S. Patent Application Publication No. 2016/0000367.

Figure 9:
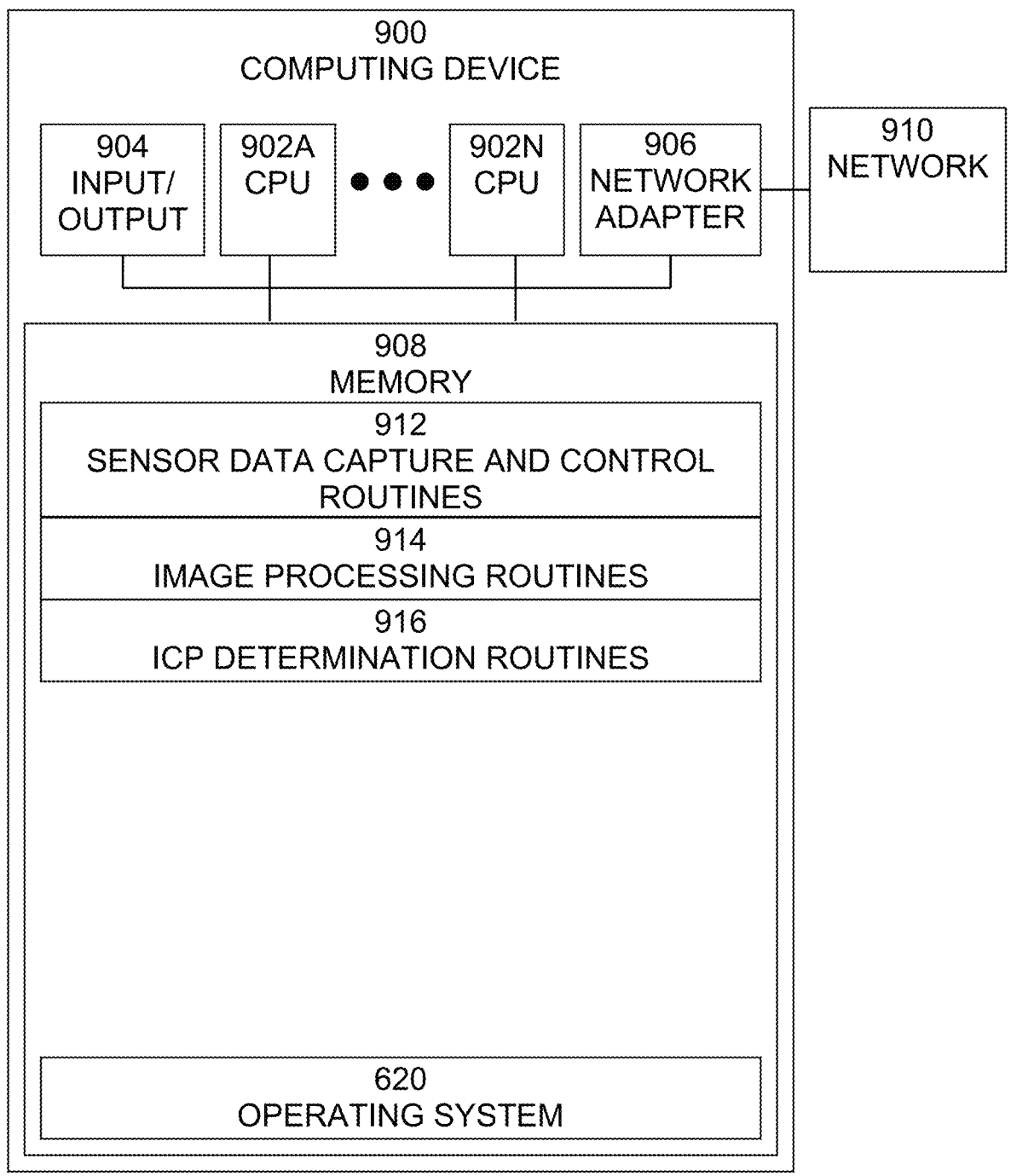
FIG. 9 is exemplary block diagram of a computer system, in which processes involved in the embodiments described herein may be implemented

An exemplary block diagram of a computer system 902, in which processes involved in the embodiments described herein may be implemented, is shown in FIG. 9. Computer system 902 may be implemented using one or more programmed general-purpose computer systems, such as embedded processors, systems on a chip, personal computers, workstations, server systems, and minicomputers or mainframe computers, or in distributed, networked computing environments. Computer system 902 may include one or more processors (CPUs) 902A-902N, input/output circuitry 904, network adapter 906, and memory 908. CPUs 902A-902N execute program instructions in order to carry out the functions of the present communications systems and methods. Typically, CPUs 902A-902N are one or more microprocessors, such as an INTEL CORE® processor. FIG. 9 illustrates an embodiment in which computer system 902 is implemented as a single multi-processor computer system, in which multiple processors 902A-902N share system resources, such as memory 908, input/output circuitry 904, and network adapter 906. However, the present communications systems and methods also include embodiments in which computer system 902 is implemented as a plurality of networked computer systems, which may be single-processor computer systems, multi-processor computer systems, or a mix thereof.

Input/output circuitry 904 provides the capability to input data to, or output data from, computer system 902. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 906 interfaces device 900 with a network 910. Network 910 may be any public or proprietary LAN or WAN, including, but not limited to the Internet.

Memory 908 stores program instructions that are executed by, and data that are used and processed by, CPU 902 to perform the functions of computer system 902. Memory 908 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 908 may vary depending upon the function that computer system 902 is programmed to perform. In the example shown in FIG. 9, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 9, memory 908 may include sensor data capture and control routines 912, image processing routines 914, ICP determination routines 916, and operating system 920. Sensor data capture and control routines 912 may include software routines to control ultrasound scanning performed by an ultrasound transducer array and to receive data produced by scanning with such an array. Image processing routines 914 may include software routines to process receive data produced by scanning to generate 3D images of an eye and optic nerve/optic nerve sheath. ICP determination routines 916 may include software routines to generate an ICP value based on the generated 3D images of an eye and optic nerve/optic nerve sheath. Operating system 920 may provide overall system functionality.

As shown in FIG. 9, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A portable system for monitoring brain function of a subject, comprising:
an apparatus configured for mounting a plurality of stimulus devices and a plurality of response sensors on a head of the subject, the plurality of stimulus devices including at least one cognizance stimulus device selected from a speaker to provide auditory stimuli to the subject and fall an internal display to provide visual stimuli to the subject, and the plurality of response sensors including at least one cognizance sensor selected from a microphone to record sounds made by the subject, a camera to record eye position and movement of the subject, and a touch/motion sensor to receive input from the subject;
a processor and memory for executing and storing program instructions to provide stimuli to the subject using the plurality of stimulus devices, to receive responses of the subject recorded by the plurality of response sensors, and to process the received responses to generate response information; and
an external display mounted to the apparatus and configured to display the generated response information.

2. The system of claim 1, further comprising communications circuitry to transmit the received responses and the generated response information and to receive information relating to stimuli to be provided to the subject.

3. The system of claim 1, wherein the plurality of response sensors further includes at least one physiological sensor selected from a vibration sensor, a heart rate monitor, a blood oxygen saturation sensor, a temperature sensor, a head position sensor, and a vibration microphone.

4. The system of claim 1, further comprising a vibration sensor configured to remove background vibration artifacts from signals received at the plurality of response sensors.

5. The system of claim 1, further comprising at least one of a transcranial Doppler device, an electroencephalograph monitor device, and an optic nerve sheath diameter measurement device.

6. The system of claim 1, further comprising an optic nerve sheath diameter measurement device that comprises a two-dimensional array of ultrasonic transducers to scan across the optic nerve sheath, wherein
the processor is configured for receiving and processing data obtained from the two-dimensional array of ultrasonic transducers, calculating volumes of segments of an optical nerve sheath of a subject, and producing a three-dimensional image of the optical nerve sheath on the external a graphical display in communication with the processor.

7. The system of claim 6, wherein the processer stores an algorithm for calculating the volume of segments of the optic nerve sheath.

8. The system of claim 6, wherein the two-dimensional array of ultrasonic transducers comprises lights for aligning the ultrasonic transducers with the optic nerve sheath.

9. The system of claim 1, wherein the apparatus is a pair of goggles.

10. A portable telemedicine system for monitoring brain function of a subject, comprising:
a wearable platform comprising a plurality of stimulus devices, a plurality of response sensors, and an external display screen each mounted to the wearable platform, wherein the plurality of stimulus devices comprise a speaker to provide auditory stimuli to the subject and an internal display to provide visual stimuli to the subject, and the plurality of response sensors comprise a microphone to record sounds made by the subject, a camera to record eye position and movement of the subject, and a touch/motion sensor to receive input from the subject, and wherein the external display screen is configured to display information received at the plurality of response sensors; and
a processor and memory for executing and storing program instructions to provide stimuli to the subject using the plurality of stimulus devices, to receive responses of the subject recorded by the plurality of response sensors, and to process the received responses to generate response information.

11. The system of claim 10, further comprising communications circuitry to transmit the received responses and the generated response information and to receive information relating to stimuli to be provided to the subject.

12. The system of claim 10, wherein the plurality of response sensors further includes at least one physiological sensor selected from a vibration sensor, a heart rate monitor, a blood oxygen saturation sensor, a temperature sensor, a head position sensor, and a vibration microphone.

13. The system of claim 10, further comprising a vibration sensor configured to remove background vibration artifacts from signals received at the plurality of response sensors.

14. The system of claim 10, wherein the plurality of response sensors are used to monitor the subject's level of consciousness.

15. The system of claim 10, further comprising at least one of a transcranial Doppler device, an electroencephalograph monitor device, and an optic nerve sheath diameter measurement device.

16. The system of claim 15, wherein the transcranial Doppler device, the electroencephalograph monitor device, and the optic nerve sheath diameter measurement device are only activated after the subject has been determined to be unconscious.

17. A method for automatic monitoring of brain function in a subject in need thereof, utilizing the system of claim 10, comprising,
placing the wearable platform onto the head of the subject in need of monitoring, providing stimuli to the subject through one of the plurality of stimulus devices, recording the subject's response or lack of response to the stimuli, and displaying the subject's response on the external display screen.

18. The method of claim 17, wherein the subject is in a mass casualty environment, is being transported, or is undergoing surgery.

* * * * *